Jan. 27, 1942.    H. W. CARDWELL ET AL    2,271,252
DRUM CLUTCH
Filed July 27, 1940
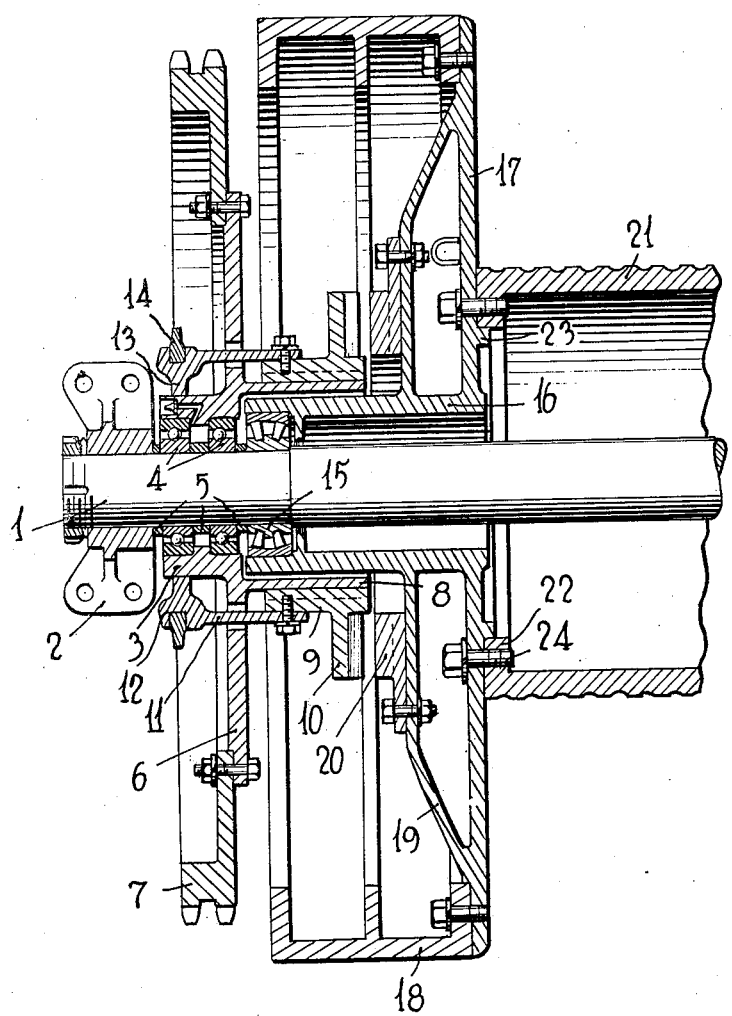
Inventors
Harland W. Cardwell,
Gerald G. Brown,
By Bacon + Thomas
Attorneys Patented Jan. 27, 1942

2,271,252

UNITED STATES PATENT OFFICE 2,271,252

DRUM CLUTCH

Harland W. Cardwell and Gerald G. Brown, Wichita, Kans., assignors to Cardwell Manufacturing Company, Inc., Wichita, Kans.

Application July 27, 1940, Serial No. 347,966

4 Claims. (Cl. 192—67)

This invention relates to a drum clutch, such, for example, as is used in hoisting machines.

As a general rule in hoisting machines, the driving member, the clutch and the driven member must be crowded into a small space. Thus, there is no room for a clutch operating mechanism between the driving member and the driven member. To produce an operable device in the past, it has been necessary to employ a driving member to which one-half of the clutch is fixed, the clutch being engaged and disengaged by sliding the driving member with half of the clutch fixed thereto along the shaft. This is accompanied by the disadvantage that the driving member is not always in alignment with its source of power. Transmission of power through the driving member when it is out of alignment results in excessive wear and short life of equipment.

The object of this invention is to obviate the difficulties present in such prior drum clutches.

This is accomplished by making the shiftable clutch member slidable on the splined hub of the driving member, the mechanism for operating the clutch being placed on the opposite side of the driving member and extending through it. In this way the shiftable clutch member can be moved into and out of engagement with its cooperating clutch member while the driving mechanism remains in alignment with the source of power.

This can be best demonstrated by reference to the drawing wherein 1 refers to a shaft upon which the mechanism is mounted. This shaft is carried by a suitable bearing 2. Mounted upon shaft 1 is sprocket hub 3 supported thereon by a pair of ball bearings 4 on both sides of which are suitable spacers 5. The sprocket hub has a flange or spokes 6 extending radially, to which is fastened sprocket 7. This sprocket is driven from a suitable source of power not shown. The sprocket hub 3 has a splined sleeve 8 extending from the rear portion thereof. Mounted on this splined sleeve is a shiftable clutch member 9 in the form of a sleeve carrying a clutch element 10. Fastened to said member 9 are arms 11 extending through the sprocket flange or spokes 6, and terminating in clutch throw-out yoke retainer 12, which has a flange portion 13 adapted to rotate with the sprocket hub but which is free to move longitudinally along said hub. Clutch yoke 14 is carried by the clutch throw-out yoke retainer 12.

Another bearing 15 is mounted on the shaft separated from the bearing 4 by a spacer 5. Mounted upon this bearing 15 is drum hub 16. As will be seen, this drum hub underlies the sprocket hub for a considerable distance which results in a compact structure. Hub 16 has flange 17 which serves as a drum end and which supports a brake surface 18. Extending from a point adjacent the periphery of the flange 17 to a point intermediate the middle of the hub and the drum end thereof is a member 19 which serves to carry a second clutch member 20 and to strengthen said flange against pressure from the rope on the drum. The drum 21 has an inwardly extending flange 22 which engages a shoulder 23 on the flange 17. The flanges 17 and 22 are suitably fastened together as by bolts 24.

The operation of the clutch is as follows: With the clutch out of engagement, as illustrated in the drawing, pressure is applied to clutch yoke 14 by any suitable means as, for example, a lever or a pressure cylinder. This pressure is transmitted through the clutch throw-out yoke retainer 12 and arms 11 to the shiftable clutch member 9 which is splined on the sprocket hub 3 and causes the shiftable clutch member to move along the splined hub into engagement with the second clutch member 20, thereby driving the drum hub 16 and the drum 21. The clutch may be disengaged by the application of pressure on the opposite side of the clutch yoke 14.

It is to be noted that the sprocket wheel 7 remains in its original position and once it has been aligned with a source of power is never moved out of that alignment. This results in increased efficiency of operation as well as in longer life of the equipment.

The drawing has illustrated the device as driven from a sprocket wheel. It is evident, however, that any other driving mechanism may be used with the corresponding advantages. Likewise, the device has been described with reference to a hoisting machine but the invention is not limited to this type of a device but may be used in any place where a clutch may be desirable.

While only one end of the shaft has been illustrated, it is evident that the other end of the shaft may be mounted in conventional bearings or may be attached to a similar driving mechanism provided with a sprocket of the same or different size, whereby the drum may be driven from two sources of power or at different speeds.

It is apparent that numerous changes may be made in the form, construction and arrangement of the several parts without departing from the spirit or scope of our invention, and while a specific embodiment has been disclosed in the drawing it is understood that the details thereof may be varied within the scope of the following claims.

What we claim is:

1. In a hoisting apparatus, a shaft carried by a support, a sprocket mounted on said shaft, a drum having an outwardly extending tubular hub portion, said drum being mounted on said shaft near the outward end of said tubular hub portion, a sleeve extending inwardly from the hub of said sprocket, and surrounding a portion of said tubular hub of said drum, a clutch member carried by said drum, and clutch means slidable along said sleeve and adapted to engage said clutch member to drive said drum from said sprocket.

2. A clutch mechanism comprising a shaft, a driving member having a hub mounted on said shaft, said hub having a sleeve portion extending therefrom, a driven member having a tubular hub portion extending inside said sleeve portion, said driven member being mounted on said shaft by means of said tubular hub portion at a point inside said sleeve portion, a clutch member carried by said driven member, and clutch means slidable along said sleeve portion and adapted to engage said clutch member to drive said driven member.

3. In a hoisting apparatus, a shaft carried by a support, a sprocket mounted on said shaft immediately adjacent said support, a sleeve carried by said sprocket and extending inwardly therefrom, a tubular member located partially inside said sleeve and being mounted on said shaft at a point immediately adjacent said sprocket, a drum carried by said tubular member, a clutch member associated with said drum, and a cooperating clutch member non-rotatably mounted on said sleeve but longitudinally slidable therealong and adapted to engage said first mentioned clutch member to drive said drum.

4. In a hoisting apparatus, a shaft carried by a support, a sprocket mounted on said shaft immediately adjacent said support, a sleeve carried by said sprocket and extending inwardly therefrom, a tubular member located partially inside said sleeve and being mounted on said shaft at a point immediately adjacent said sprocket, a drum carried by said tubular member, a clutch member associated with said drum, a cooperating clutch member non-rotatably mounted on said sleeve but longitudinally slidable therealong and adapted to engage said first mentioned clutch member to drive said drum, and means extending through said sprocket for operating said clutch from the shaft support side of said sprocket.

HARLAND W. CARDWELL.
GERALD G. BROWN.